June 26, 1928.
W. A. JENNINGS
BORING MECHANISM
Filed Feb. 24, 1925
1,674,863
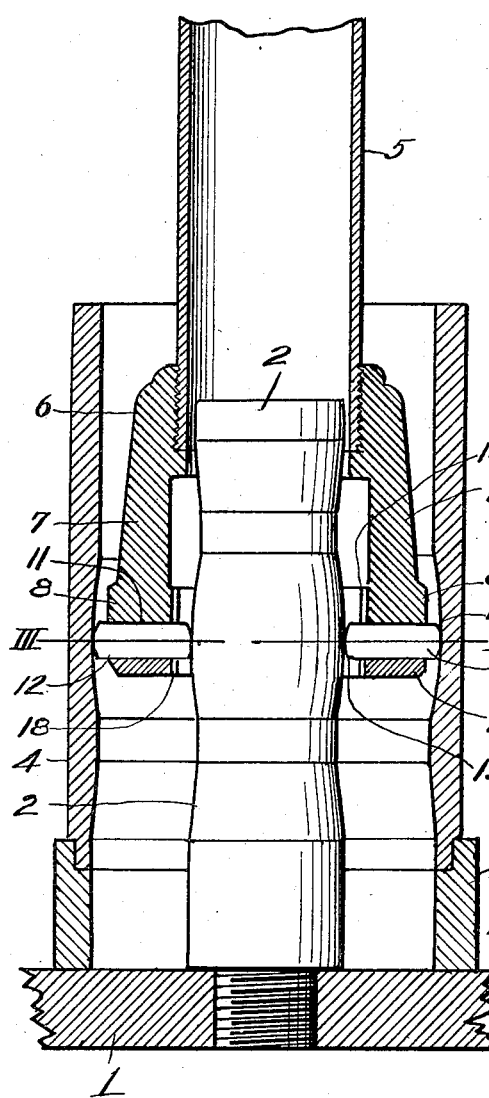
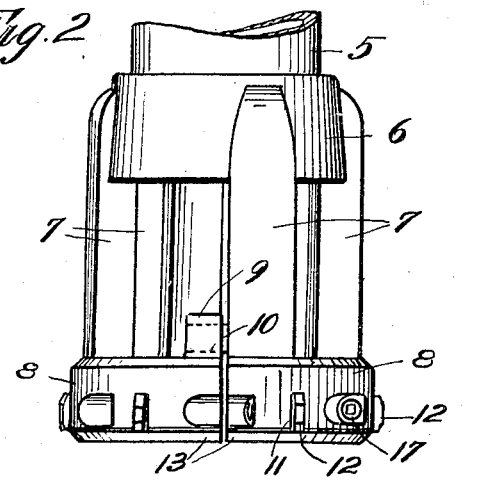
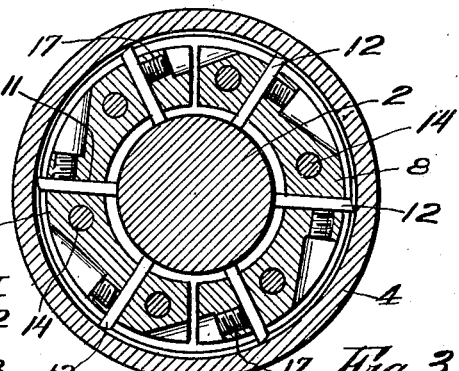
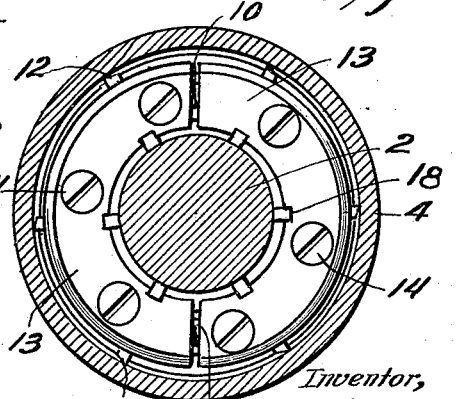
Inventor,
William A. Jennings,
By Thorpe & Levard,
Attys.
Witness:
R. E. Hamilton Patented June 26, 1928.

1,674,863

UNITED STATES PATENT OFFICE.

WILLIAM A. JENNINGS, OF RAYTOWN, MISSOURI.

BORING MECHANISM.

Application filed February 24, 1925. Serial No. 11,084.

This invention relates to that type of boring apparatus utilizing a central guide post or bearing within the cutter head and is an improvement over my application for patent for boring apparatus, filed December 3, 1923, Serial No. 678,186, Patent No. 1,549,985, Aug. 18, 1925. One of the objects of the present invention is to produce boring apparatus substantially similar to the apparatus shown in said application but differing therefrom in that provision is made for the boring of tapering passages in accordance with a pattern formed by the central bearing or guide post.

Another object is to produce boring apparatus of such nature that the bits may be adjustably disposed to bore straight passages of greater diameter than the normal capacity of a particular bit.

A further object is to produce boring apparatus of strong, durable, efficient and inexpensive construction; and in order that it may be fully understood, reference is to be had to the accompanying drawing, in which:—

Figure 1 is a central vertical section taken through a boring apparatus embodying the invention as it will appear when in use in boring a passageway formed with irregular or tapering walls.

Figure 2 is a side view of the tool.

Figure 3 is a section on the line III—III of Figure 1.

Figure 4 is a bottom plan view of the tool as shown in Figure 1.

In the said drawing, where like reference characters identify corresponding parts in all of the figures, 1 indicates a bed or other suitable rigid support and removably mounted on said support is a guide post or pattern 2 forming a central bearing and illustrated as varying in diameter at different points in its length. Resting on the bed and concentric with the post is a tubular supporting member 3 for a cylindrical piston, the hub of a pulley or other tube 4,—the inner surface of which is to be bored in accordance with the pattern formed by the central post 2,—is securely fixed against rotation in any suitable manner.

The cutter or boring tool comprises a hollow drive shaft 5 of greater diameter than the guide post 2 and having a suitable bearing at its upper end (not shown), axially alined with the guide post and adapted to be rotated and moved longitudinally by any suitable source of power, such as, for example, a drill press or the like. The lower end of the drive shaft is threaded or otherwise secured to a collar 6 of a cutting head. Secured to said collar and projecting downwardly therefrom are two pairs of arms 7, each pair of arms carrying at their lower ends a cutting sector 8. The arms 7 are more or less resilient and when unimpeded the ends of the sectors abut and form a bearing somewhat smaller in diameter than the diameter of the guide post, and in order to slip the driving head over said post, it is necessary to expand the sectors. The sectors are expanded by forming on each sector near one of its ends, an internally threaded boss 9 engaged by a socketed screw 10 which will press at its end against the adjacent arm 7 of the opposed sector (see Figure 2).

In the lower faces of the sectors a series of radial oppositely arranged slots 11 are formed, and snugly received within each of said slots is a cutting bit 12, the bits being held in position by a pair of clamp or cover plates 13 secured to the lower faces of each sector by screws 14.

When the tool is to be used to produce an irregular passageway, the sectors are expanded by the use of the screws 10 until the driving head will readily pass over the desired pattern and bearing post 2, the slots 11 being preliminarily fitted with suitable bits 12 which are free to slide in the slots. In this connection, it is to be pointed out that the boring operation may be carried out vertically downwardly or upwardly as desired, and as illustrated in Figure 1 the operation is upward. In order to prevent the bits from accidentally catching or binding on the central post or against the wall being bored, the inner ends of the bits are beveled as at 15 and the outer corners are also beveled as at 16 to form a round nose bit for boring irregular surfaces and also to aid in starting the boring operation of the bit.

With the bits freely sliding as described, it will be evident that as they abut at their inner ends against the guide post 2, they will travel inwardly and outwardly in accordance with the pattern formed on the post, and will reproduce on the inner face of the cylinder being bored a surface corresponding exactly to the surface of the post. The bits move inwardly due to the resistance offered by the cylinder wall being cut, provided the distance between the said wall and the post in the horizontal plane of the bits is less than the length of the latter, and conversely the bits move outward as the expanding diameter of the post forces them in that direction and hence cause them to make a cut of increasing depth in the wall of the cylinder.

If it is desired to bore a straight cylinder, a straight shaft 2 is substituted for the irregular shaft illustrated, and the screws 10 are unscrewed to permit the arms 7 to contract until the inner faces of the sectors 8 are properly seated on the guide post, it being understood that as the sectors are of smaller diameter than the post, they will seat on the posts only adjacent their ends as set out in my application above cited. Bits of the proper length are now inserted in the slots 11 and are shoved inwardly until they come to rest against the guide post 2 and are locked in this position by means of socketed screws 17 arranged in the sectors to exert clamping pressure on the bits (see Figure 3). The tool is now ready to perform the boring operation and the work is carried out as described in connection with the boring of an irregular passageway.

If it should be desired to increase the diameter of a straight passageway beyond the capacity of the bits as limited by their length, the inner wall of each sector and cover plate is notched as at 18 in line with the slots 11. With the sectors engaged with the post 2 and forming the bearing, the bits 12 are adjusted by unscrewing the screws 17 and shims equal in width to the width of the notches 18 are fitted in the said notches between the bits and against the central post and the bits are shoved in against the shims, and consequently project outwardly a distance equal to the thickness of the shims. After all of the bits have been set in this manner they are locked by means of the screws 17 and the driving head is ready for operation, it being understood that in this instance the adjacent ends of the sectors also form the bearings through engagement of the shims with the central shaft.

From the above description, it will be apparent that I have produced a device possessing the features of advantage set forth as desirable, and while I have described and claimed the preferred embodiment of the same, it is to be understood that I reserve the right to make all changes properly falling within the spirit and scope of the appended claims.

I claim:

1. In a boring apparatus, the combination with a central fixed guide post, of a rotatable cutter head comprising a series of resilient arms disposed around the post, a pair of sectors carried by pairs of said arms, means to spring the arms outward to dispose said sectors to receive the guide post between them, and radially arranged oppositely disposed sliding bits in said sectors and limited as to inward movement by said fixed guide post, the ends of said bits rotating around said post when the cutter head is in operation and being free to reciprocate inwardly or outwardly according to the shape of the guide post.

2. In a boring apparatus, the combination with a central fixed guide post, of a rotatable cutter head comprising a series of resilient arms, a pair of sectors carried by pairs of said arms, means to expand said sectors to fit over the guide post, radially arranged oppositely disposed slots in said sectors, bits slidable in said slots, and means to lock the bits in position with their inner ends against said fixed guide post, said bits rotating around the post when the cutter head is in operation and being free to reciprocate inwardly or outwardly according to the shape of the guide post.

3. In a boring apparatus, the combination with a driving shaft carrying a rotatable cutter head, a fixed center guide post, and radially arranged oppositely disposed bits slidably mounted in said cutter head and having their inner ends in abutment with said fixed guide post, and rotating around the same when the cutter head is in operation and being free to reciprocate inwardly or outwardly according to the shape of the guide post.

In witness whereof I hereunto affix my signature.

WILLIAM A. JENNINGS.